US012657502B2

(12) United States Patent
Gaebler et al.

(10) Patent No.: US 12,657,502 B2
(45) Date of Patent: Jun. 16, 2026

(54) LOSS OR UNDESIRED REORDERING OF QUANTUM OBJECTS DETECTION

(71) Applicant: Quantinuum LLC, Broomfield, CO (US)

(72) Inventors: John Pagnucci Gaebler, Golden, CO (US); Stephen Dale Erickson, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 345 days.

(21) Appl. No.: 18/454,336

(22) Filed: Aug. 23, 2023

(65) Prior Publication Data

US 2024/0354622 A1      Oct. 24, 2024

Related U.S. Application Data

(60) Provisional application No. 63/408,753, filed on Sep. 21, 2022.

(51) Int. Cl.
*G06N 10/40*       (2022.01)
*G06N 10/20*       (2022.01)

(52) U.S. Cl.
CPC ............. *G06N 10/40* (2022.01); *G06N 10/20* (2022.01)

(58) Field of Classification Search
CPC ......... G06N 10/20; G06N 10/40; H04B 10/70
See application file for complete search history.

(56) References Cited

U.S. PATENT DOCUMENTS

| | | |
|---|---|---|
| 11,049,713 B1 | 6/2021 | Kokish et al. |
| 2020/0116623 A1* | 4/2020 | Cooper-Roy .......... G06N 10/70 |
| 2022/0108202 A1 | 4/2022 | Gaebler et al. |

OTHER PUBLICATIONS

Zhukas et al, 138Ba+ Zeeman Qubit Operation Through Raman Transition, APS Division of Atomic and Molecular Physics Meeting 2020 (Year: 2020).*

Mourik et al, "Coherent Rotations of Qubits Within a Multi-Species lon-Trap Quantum Computer", Submitted Jan. 8, 2020 to Cornell University Online Library Archive, https://arxiv.org/pdf/2001.02440.pdf, 18 pages (Year: 2020).*

(Continued)

*Primary Examiner* — David E Smith

(74) *Attorney, Agent, or Firm* — Alston & Bird LLP

(57) ABSTRACT

Various embodiments provide methods, apparatuses, systems, or computer program products for performing quantum object loss detection. The method performed by a controller of a quantum computer includes controlling one or more voltage sources to cause a quantum object confinement apparatus to confine a quantum object crystal, where the quantum object crystal (i) includes at least one of (a) a first species quantum object or (b) a second species quantum object and (ii) defines a crystal axis that is aligned along the RF null axis of the quantum object confinement apparatus; causing at least one first control signal to be provided to at least one control electrode of the plurality of control electrodes, where the at least one first control signal causes the at least one control electrode to generate a push field configured to cause the quantum object crystal axis to rotate with respect to the RF null axis.

20 Claims, 8 Drawing Sheets

(56) References Cited

OTHER PUBLICATIONS

Pino et al, "Demonstration of the Trapped-Ion Quantum CCD Computer Architecture", submitted on Apr. 9, 2021 to Cornell University Online Library Archive, https://arxiv.org.pdf/2003.01293. pdf, 11 pages (Year: 2021).*

Goham, C. J. B., et al., "Resolved-sideband Micromotion Sensing in Yb+ on the 935 nm Repump Transition", submitted on Nov. 22, 2021 to Cornell University Online Library Archive, available on the Internet at https://arxiv.org/pdf/2111.11504v1.pdf, 8 pages.

Kielpinski, D., et al., "Architecture for a large-scale ion-trap quantum computer", Nature, Jun. 13, 2002, pp. 709-711, vol. 417, Nature Publishing Group, Germany.

Outgoing—ISA/210—International Search Report Mailed on Jan. 22, 2024 for WO Application No. PCT/US23/074529, 5 page(s).

Outgoing Written Opinion of the ISA Mailed on Jan. 22, 2024 for WO Application No. PCT/US23/074529, 12 page(s).

Pino, J. M., et al., "Demonstration of the trapped-ion quantum-CCD computer architecture", submitted on Apr. 9, 2021 to Cornell University Online Library Archive available on the Internet at https://arxiv.org/pdf/2003.01293.pdf, 11 pages.

Shaftan, Timur, et al., "Cold ion beam in a storage ring as a platform for large-scale quantum computers and simulators: challenges and directions for research and development", submitted on Jan. 12, 2021 to Cornell University Online Library Archive, available on the Internet at https://arxiv.org/ftp/arxiv/papers/2101/2101.04247.pdf, 21 pages.

Stricker, Roman, et al., "Deterministic correction of qubit loss", submitted Feb. 21, 2020 to Cornell University Online Library Archive, retrieved from the Internet at https://arxiv.org/pdf/2002. 09532.pdf on Mar. 20, 2024, 13 pages.

Van Mourik, Martin W., et al., "Coherent rotations of qubits within a multi-species ion-trap quantum computer", submitted Jan. 8, 2020 to Cornell University Online Library Archive, available on the Internet at https://arxiv.org/pdf/2001.02440.pdf, 18 pages.

Wikipedia Contributors, "Frequency modulation", retrieved from the Internet at https://en.wikipedia.org/wiki/Frequency_modulation on Mar. 20, 2024, 7 pages.

English translation of JP Decision to Grant dated Mar. 24, 2026 for JP Application No. 2025517464, 2 page(s).

JP Decision to Grant Mailed on Mar. 24, 2026 for JP Application No. 2025517464, 3 page(s).

* cited by examiner

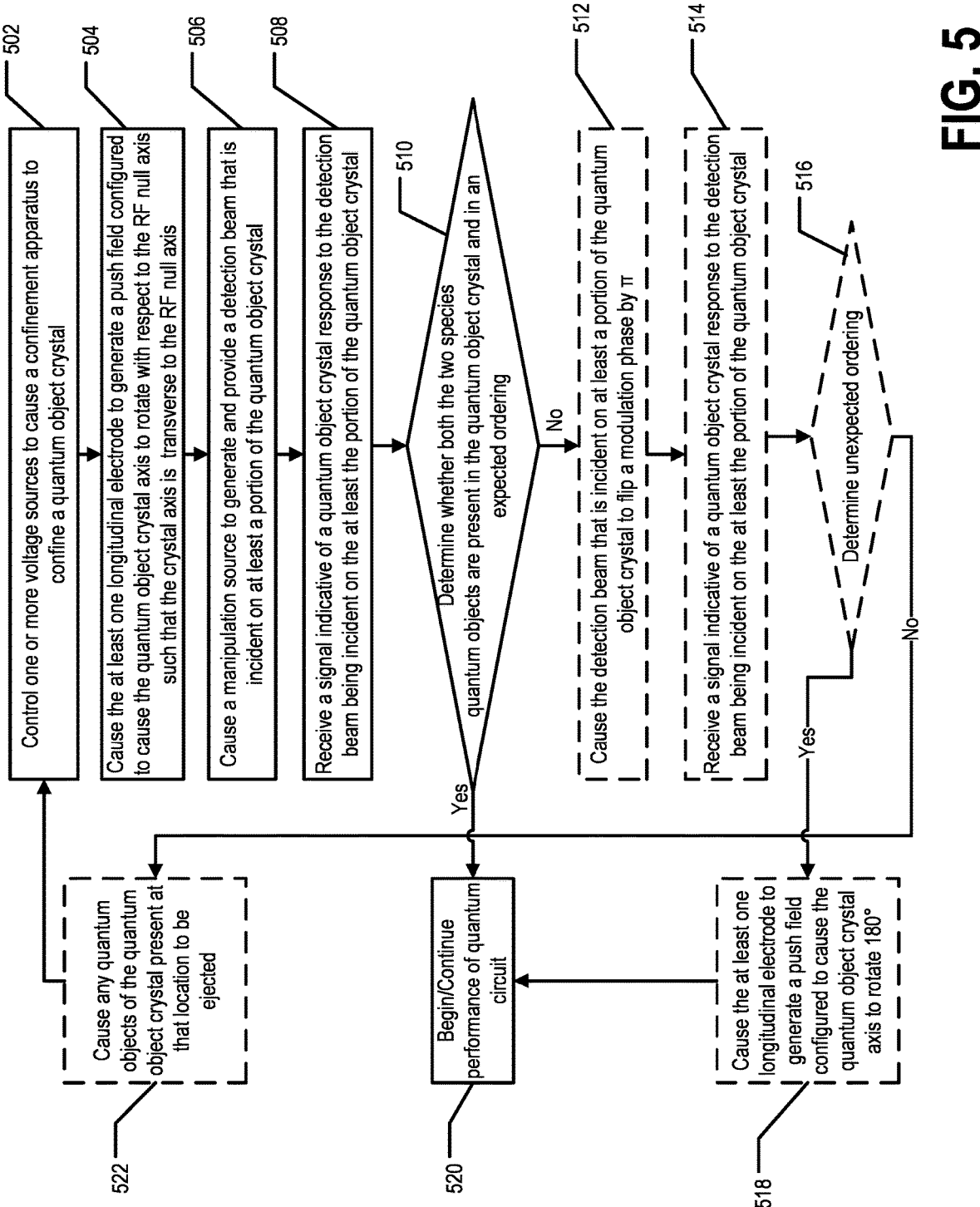

502 — Control one or more voltage sources to cause a confinement apparatus to confine a quantum object crystal 504 — Cause the at least one longitudinal electrode to generate a push field configured to cause the quantum object crystal axis to rotate with respect to the RF null axis such that the crystal axis is transverse to the RF null axis 506 — Cause a manipulation source to generate and provide a detection beam that is incident on at least a portion of the quantum object crystal 508 — Receive a signal indicative of a quantum object crystal response to the detection beam being incident on the at least the portion of the quantum object crystal 510 — Determine whether both the two species quantum objects are present in the quantum object crystal and in an expected ordering No 512 — Cause the detection beam that is incident on at least a portion of the quantum object crystal to flip a modulation phase by π

514 — Receive a signal indicative of a quantum object crystal response to the detection beam being incident on the at least the portion of the quantum object crystal 516 — Determine unexpected ordering Yes No 522 — Cause any quantum objects of the quantum object crystal present at that location to be ejected 520 — Begin/Continue performance of quantum circuit 518 — Cause the at least one longitudinal electrode to generate a push field configured to cause the quantum object crystal axis to rotate 180°

FIG. 5

LOSS OR UNDESIRED REORDERING OF QUANTUM OBJECTS DETECTION

CROSS-REFERENCE TO RELATED APPLICATIONS

This application claims priority to U.S. Application No. 63/408,753, filed Sep. 21, 2022, the content of which is incorporated herein by reference in its entirety.

TECHNICAL FIELD

Various embodiments relate to apparatuses, systems, and methods relating to detecting quantum object losses or undesired reordering within a quantum object confinement apparatus. For example, some example embodiments relate to the detection of a loss of a qubit of a quantum computer.

BACKGROUND

Quantum computing is the use of quantum phenomena such as superposition and entanglement to perform computation. In particular, quantum bits (qubits) are acted on to cause and/or control evolution of quantum states of the qubits to perform one or more calculations. The trapped ion quantum computer makes use of ions confined by an ion trap as the data qubits used for such computation. However, in various scenarios an ion may interact with background gas, for example, and be ejected from the ion trap. Thus, ion losses or undesired reordering of ions can occur during the computation or even before the computation, leading to errors in the resulting computation. It is challenging to detect ion losses or undesired reordering of ions effectively and accurately amid computation in an ion trap without introducing qubit errors or otherwise negatively affecting the ions if no loss has occurred. Through applied effort, ingenuity, and innovation many deficiencies of such prior detection techniques have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for determining, identifying, and/or detecting when a quantum object is missing from an expected location of the quantum object defined by a quantum object confinement apparatus. Various embodiments correspond to a quantum computer, such as a quantum charge-coupled device (QCCD)-based quantum computer, for example, and determining and/or identifying instances when a quantum object is missing from an expected location of the quantum object defined by a quantum object confinement apparatus. For example, the qubit of the quantum computer may be an atom and/or ion or other quantum particle which may be part of quantum object crystal and/or group. In various embodiments, the quantum object is trapped and/or confined within a quantum object confinement apparatus, such as an ion trap, a surface ion trap, and/or the like.

In various embodiments, the loss or reordering of a quantum object from the confinement apparatus is detected before any reading the quantum state of at least one qubit of a quantum object crystal so as to accurately detect quantum objects without introducing qubit errors or otherwise negatively affecting the quantum state of at least one qubit if no loss has occurred. For example, a push field and/or the oscillating potential may be generated to rotate a crystal axis of the quantum object crystal with respect to a RF null axis of a confinement region such that the crystal axis has a vector component transverse to the RF null axis. When a quantum object within the confinement region is not disposed on the RF null axis, the quantum object will experience an oscillating radial force as a result of the trapping pseudopotential. This oscillating radial force causes the quantum object to be disposed off the RF null axis and exhibit oscillations and/or small back and forth motion. When a detection beam is provided that is either frequency modulated at the rf drive frequency or detuned from a particular transition by the rf drive frequency of the second species quantum object and incident on the rotated quantum object crystal, the oscillating motion of the second species quantum object causes the detection beam to be resonant with the particular transition. In various embodiments, the particular transition is that of a micromotion sideband corresponding to the oscillations and/or small back and form motion of the quantum object. Thus, the second species quantum object will fluoresce and/or emit stimulated emission in response to the detection beam being incident thereon. The detection beam is off-resonant from transition out of the qubit space and/or ground state of the first species quantum object. The stimulated emission may be detected and it may be determined whether both members of the quantum object crystal are present and whether ion losses or undesired reordering have occurred to the quantum object crystal.

According to a first aspect, a method performed by a controller of a quantum computer is provided. In an example embodiment, the method includes controlling one or more voltage sources to cause a quantum object confinement apparatus to confine a quantum object crystal, the quantum object confinement apparatus includes (a) one or more radio frequency (RF) electrodes defining an RF null axis of the quantum object confinement apparatus and (b) a plurality of control electrodes, where the quantum object crystal (i) includes at least one of (a) a first species quantum object or (b) a second species quantum object and (ii) defines a crystal axis that is aligned along the RF null axis of the quantum object confinement apparatus; causing at least one first control signal to be provided to at least one control electrode of the plurality of control electrodes, where the at least one first control signal causes the at least one control electrode to generate a push field configured to cause the quantum object crystal axis to rotate with respect to the RF null axis such that the crystal axis has a vector component transverse to the RF null axis; causing a manipulation source to generate and provide a modulated detection beam that is incident on at least a portion of the quantum object crystal; receiving a signal indicative of a quantum object crystal response to the modulated detection beam being incident on the at least the portion of the quantum object crystal; and determining, based on the signal, whether both (a) the first species quantum object and (b) the second species quantum object are present in the quantum object crystal.

In an example embodiment, in response to (a) the first species quantum object or (b) the second species quantum object not being present, the method further includes controlling the one or more voltage sources to cause the confinement apparatus to confine a new quantum object crystal within the confinement apparatus.

In an example embodiment, when the second species quantum object is not detected by the modulated detection beam, quantum object losses have occurred to the quantum object crystal, wherein the quantum object losses include the first species quantum object, or the second species quantum object are missing from the quantum object confinement apparatus.

In an example embodiment, in response to both (a) the first species quantum object and (b) the second species quantum object being present, the method further includes: beginning to execute a quantum circuit using the first species quantum object within the quantum object confinement apparatus; during the performance of the quantum circuit, identifying a read function to be performed on the first species quantum object, wherein the causing of the at least one first control signal to be provided to the at least one control electrode and the causing of the manipulation source to generate and provide a reading beam are performed responsive to identifying the read function to be performed; and continuing to execute the quantum circuit.

In an example embodiment, the method further includes receiving a read result responsive to the reading beam being incident at least in part on the first species quantum object; and adjusting the quantum circuit based at least in part on the read result such that the adjusted quantum circuit is executed.

In an example embodiment, the first species quantum object is a data qubit for the quantum computer and the second species quantum object is a sympathetic cooling ion.

In an example embodiment, the first species quantum object is a Ba ion, and the second species quantum object is an Yb ion.

In an example embodiment, the modulated detection beam that is incident on at least the portion of the quantum object crystal has a wavelength tuned to a micromotion sideband of the second species quantum object.

According to another aspect of the present disclosure, a controller is provided. In an example embodiment, the controller is operatively connected to one or more components of a system including a quantum object confinement apparatus. The confinement apparatus includes (a) one or more radio frequency (RF) electrodes defining an RF null axis of the quantum object confinement apparatus and (b) a plurality of control electrodes and the one or more components of the system include (a) voltage sources and (b) manipulation sources. The controller is configured to control one or more voltage sources to cause the quantum object confinement apparatus to confine a quantum object crystal, where the quantum object crystal (i) includes at least one of (a) a first species quantum object or (b) a second species quantum object and (ii) defines a crystal axis that is aligned along the RF null axis of the quantum object confinement apparatus; cause at least one first control signal to be provided to at least one control electrode of the plurality of control electrodes, where the at least one first control signal causes the at least one control electrode to generate a push field configured to cause the quantum object crystal axis to rotate with respect to the RF null axis such that the crystal axis has a vector component transverse to the RF null axis; cause a manipulation source to generate and provide a modulated detection beam that is incident on at least a portion of the quantum object crystal; receive a signal indicative of a quantum object crystal response to the modulated detection beam being incident on the at least the portion of the quantum object crystal; and determine, based on the signal, both (a) the first species quantum object and (b) the second species quantum object are present in the quantum object crystal.

According to another aspect of the present disclosure, a computer program product is provided. The computer program product includes a non-transitory computer-readable medium storing executable instructions. The executable instructions are configured to, when executed by a processing device of a controller configured to control operation of one or more components of a quantum computer, cause the controller to: control one or more voltage sources to cause a quantum object confinement apparatus to confine a quantum object crystal, the quantum object confinement apparatus includes (a) one or more radio frequency (RF) electrodes defining an RF null axis of the quantum object confinement apparatus and (b) a plurality of control electrodes, where the quantum object crystal (i) includes at least one of (a) a first species quantum object or (b) a second species quantum object and (ii) defines a crystal axis that is aligned along the RF null axis of the quantum object confinement apparatus; cause at least one first control signal to be provided to at least one control electrode of the plurality of control electrodes, where the at least one first control signal causes the at least one control electrode to generate a push field configured to cause the quantum object crystal axis to rotate with respect to the RF null axis such that the crystal axis has a vector component transverse to the RF null axis; cause a manipulation source to generate and provide a modulated detection beam that is incident on at least a portion of the quantum object crystal; receive a signal indicative of a quantum object crystal response to the modulated detection beam being incident on the at least the portion of the quantum object crystal; and determine, based on the signal, whether both (a) the first species quantum object and (b) the second species quantum object are present in the quantum object crystal.

BRIEF DESCRIPTION OF THE SEVERAL VIEWS OF THE DRAWING(S)

Having thus described the invention in general terms, reference will now be made to the accompanying drawings, which are not necessarily drawn to scale, and where:

Figure 4:
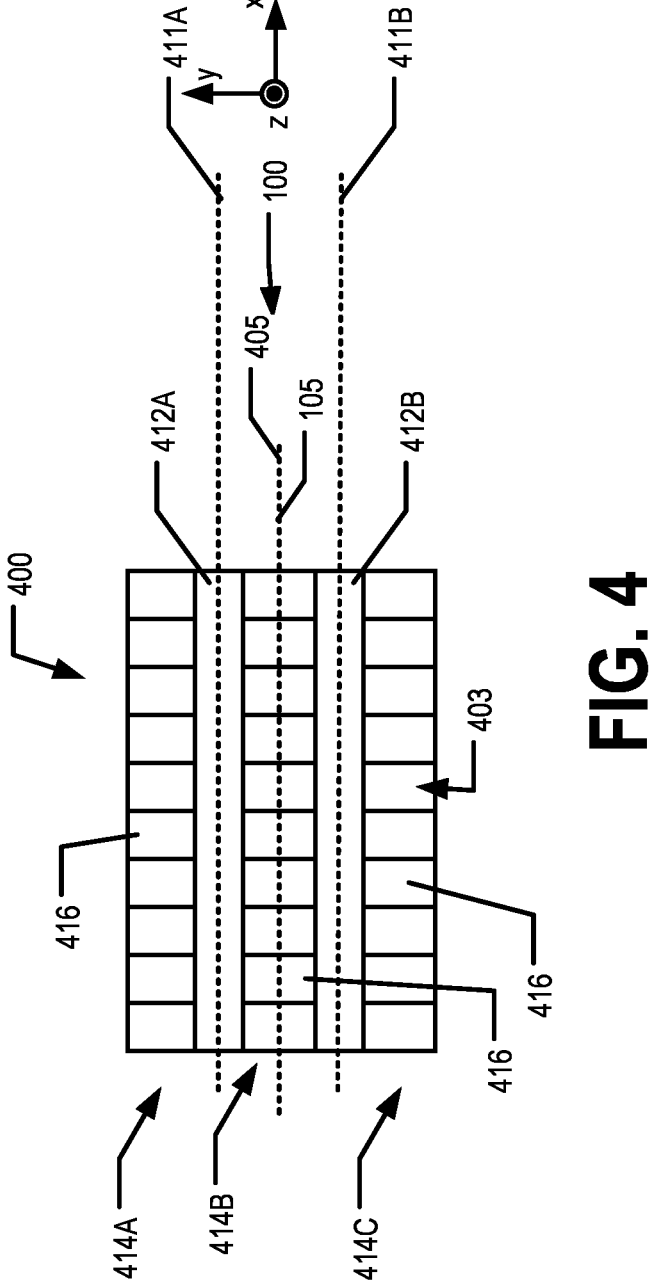

FIG. 4 provides a top view of an example quantum object confinement apparatus that may be used in example embodiment.

FIG. 5 is a flowchart of various processes, procedures, and/or operations that may be performed, for example, by a controller of the quantum object confinement apparatus, to perform a quantum object detection function, in accordance with an example embodiment.

Figure 6:
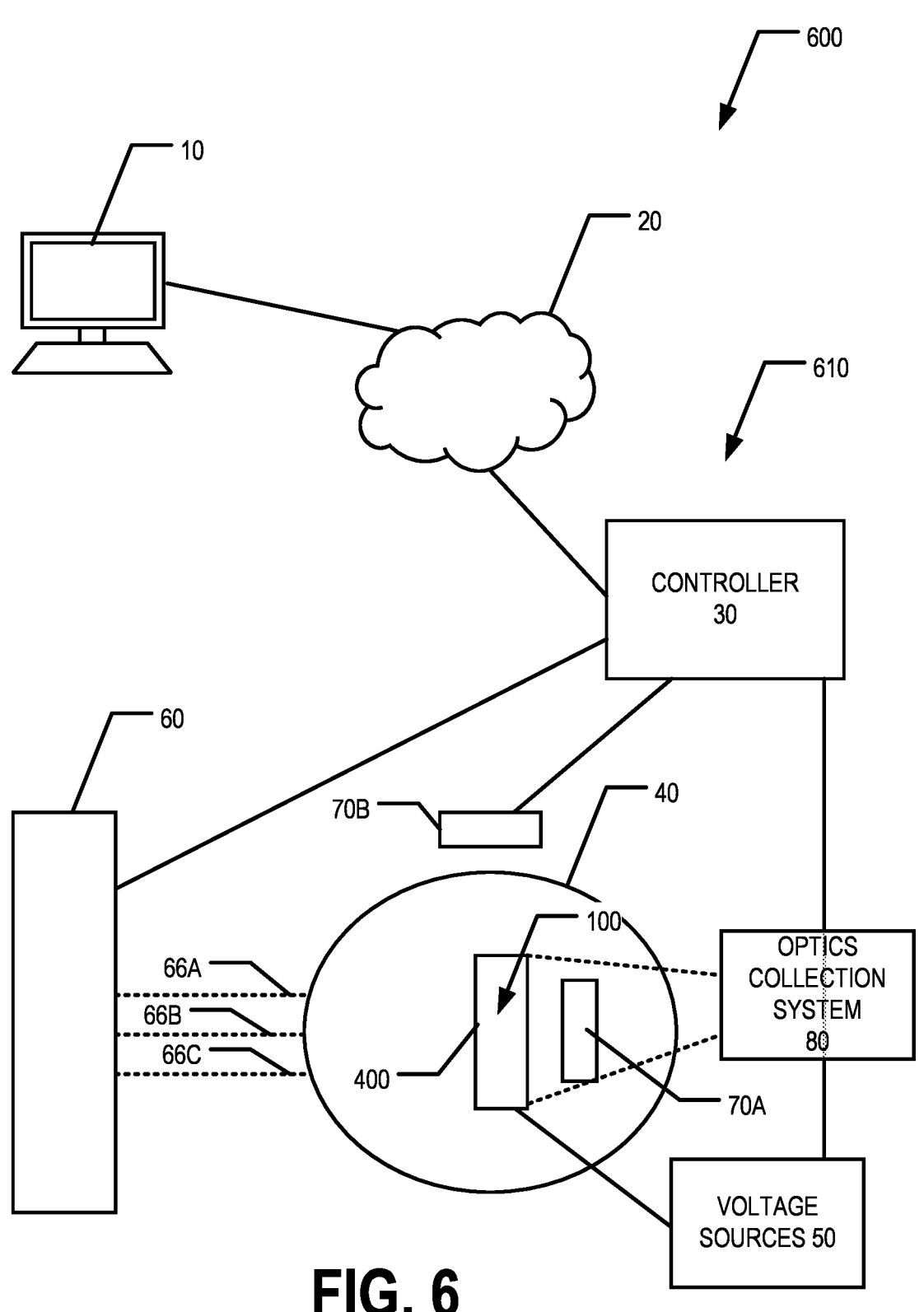

FIG. 6 is a schematic diagram illustrating an example quantum computing system configured to perform one or more quantum object detection function, according to various embodiments.

Figure 7:
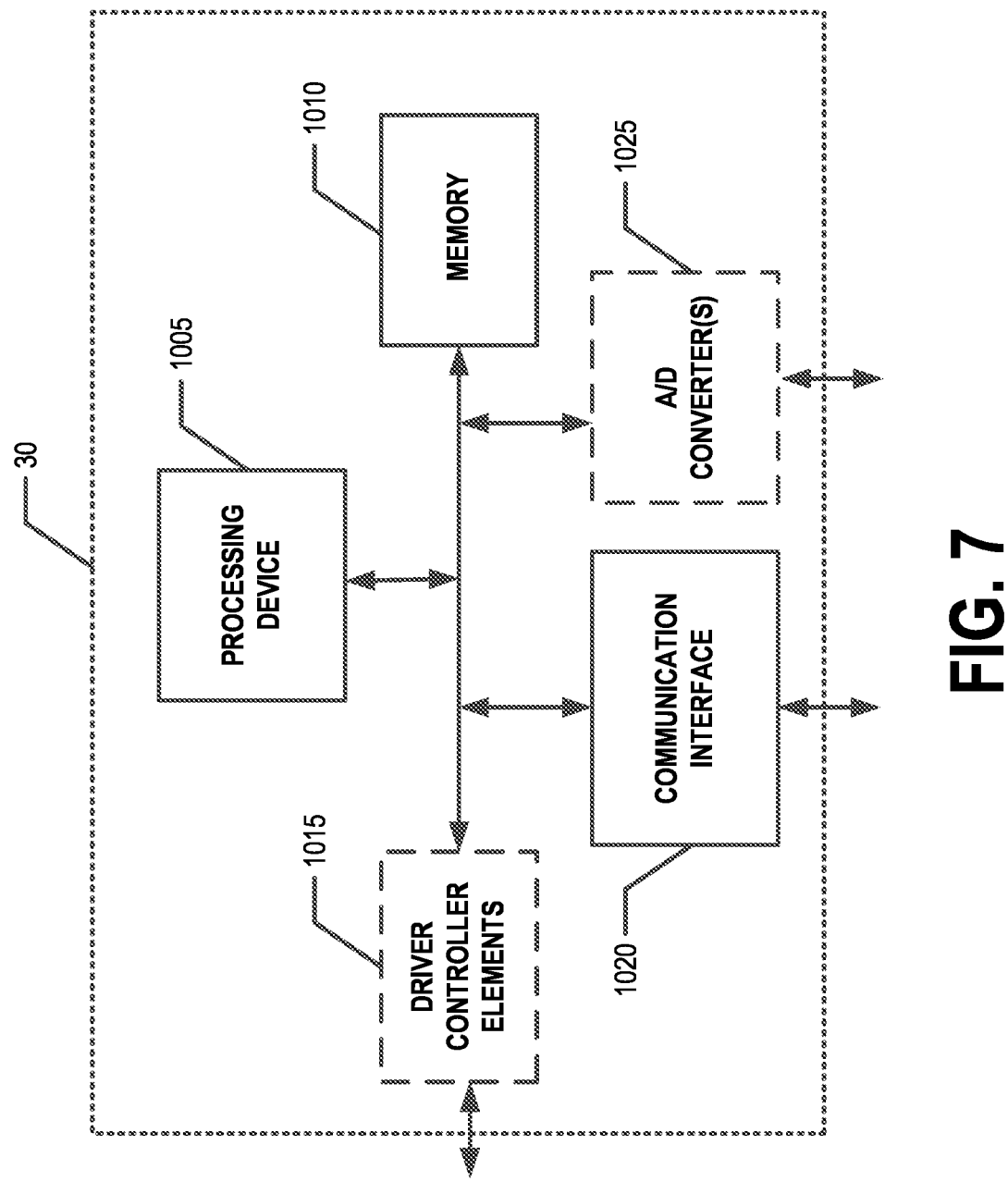

FIG. 7 provides a schematic diagram of an example controller of a quantum computer configured to perform one or more quantum object detection function, according to various embodiments.

Figure 8:
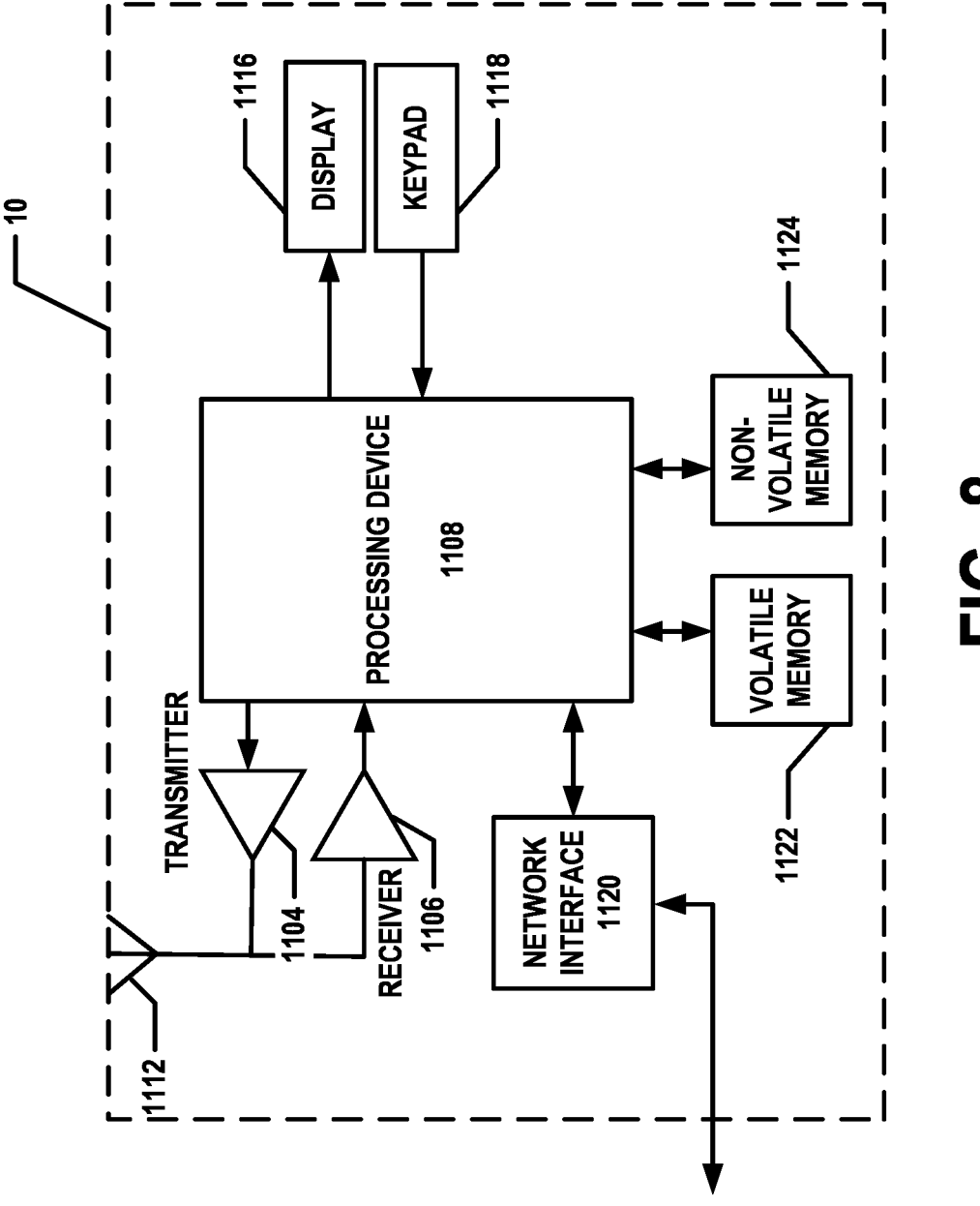

FIG. 8 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

In various embodiments, methods, apparatuses, systems, computer program products, and/or the like for determining, identifying, and/or detecting when a quantum object is missing from an expected location of the quantum object defined by a quantum object confinement apparatus. In various embodiments, quantum object crystal including at least one of (a) a first species quantum object or (b) a second species quantum object is confined within a quantum object confinement apparatus (also referred to as a confinement apparatus herein). In various embodiments, the first species quantum object and the second quantum object are ions of two different species (e.g., having different atomic numbers), different isotopes of the same species, or use different sets of energy levels within the same species (e.g., ground states and metastable states). In various embodiments, the first species quantum object and the second quantum object are disposed within a same potential well of the confinement region and interact with each other by coulomb repulsion between the first species quantum object and the second quantum object. In various embodiments, the quantum object may be part of a quantum object crystal comprising a qubit quantum object (e.g., a qubit ion) and a sympathetic cooling (SC) quantum object (e.g., SC ion). In various embodiments, the confinement apparatus is a trap or other apparatus configured to confine a plurality of quantum object crystals.

Figure 1:
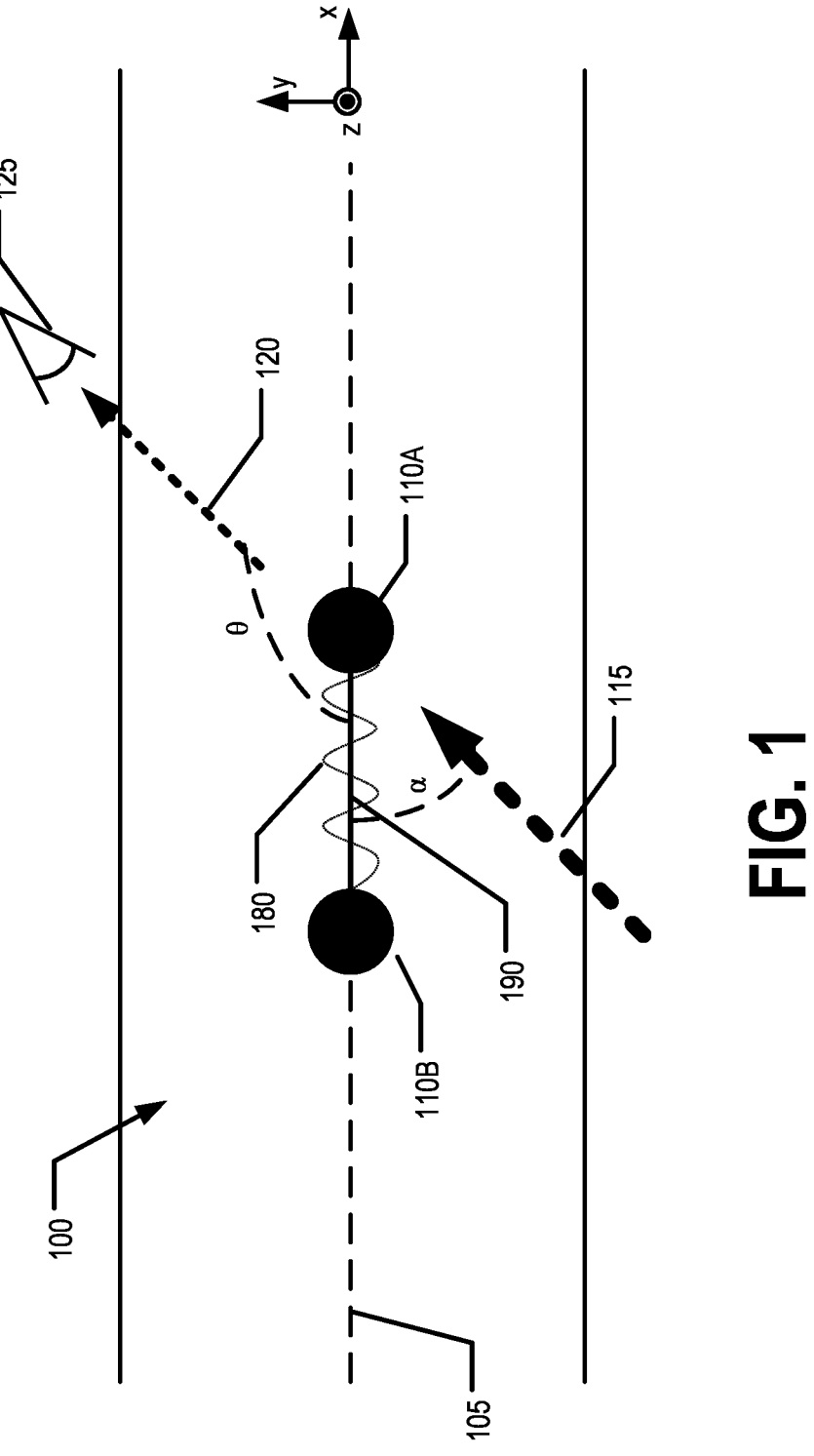
FIG. 1 is a schematic diagram of a detection function in accordance with an example embodiment.

In various embodiments, the confinement apparatus is configured to enable the performance of various functions for controlling the quantum state and/or determining a quantum state of one or more qubit quantum objects. In particular, a detection function may be used to determine whether quantum object loss has occurred to the quantum object crystal. FIG. 1 provides a schematic top view of an example detection function according to an example embodiment. A quantum object crystal 110 including at least one of (a) a first species quantum object 110A or (b) a second species quantum object 110B is confined within a confinement region 100 of a confinement apparatus. The first species quantum object 110A and the second species quantum object 110B are disposed within the same electric potential well generated by the confinement apparatus and interact with one another by a coulomb repulsion 180 between the first species quantum object 110A and the second quantum object 110B. The example confinement apparatus includes at least one radio frequency (RF) electrode and a plurality of control electrodes. In various embodiments, the at least one RF electrode generates a trapping field configured to confine the quantum object crystal 110 within the confinement region 100 of the confinement apparatus. The at least one RF electrode defines an RF null axis 105 of the confinement region 100. In an example embodiment, the RF null axis 105 is the longitudinal axis of at least a portion of the confinement region 100. In general, the quantum object crystal 110 is located and/or aligned along the RF null axis 105 such that a crystal axis 190 defined by the quantum object crystal is substantially aligned with the RF null axis 105.

When a reading function is performed to determine the quantum state of a qubit quantum object, a reading beam 115 is provided to the confinement region 100 such that the reading beam 115 is at least partially incident on the first species quantum object 110A. In various embodiments, the reading beam 115 is incident on the first species quantum object at a reading incident angle $\alpha$. In various embodiments, the reading beam 115 is a laser beam that is characterized by a frequency/wavelength that is resonant with a particular transition of the first species quantum object 110A. For example, the particular transition may be from a first state (e.g., qubit state 1) to another state (e.g., qubit state 0 or another quantum state of the quantum object). When the reading beam 115 is incident on the first species quantum object 110A and the quantum object is in the first state, the first species quantum object 110A fluoresces by emitting the stimulated emission 120. In various embodiments, the stimulated emission 120 is emitted by the first species quantum object 110A at a variety of emission angles $\theta$. At least some of the stimulated emission 120 is detected by detector 125. In various embodiments, the detector 125 is in communication with a controller and/or other computing entity configured to receive an indication of the detection of the stimulated emission 120 by the detector 125.

The qubit may be read and/or detected by providing a reading beam (e.g., a laser beam that has a frequency/wavelength that is resonant with a particular quantum transition of the quantum object being used as the qubit) that is incident upon the qubit (e.g., quantum object) to be read. For example, when the qubit (e.g., quantum object) fluoresces in response to the reading beam being incident thereon, the qubit is in one state (e.g., state 1) and when the qubit (e.g., quantum object) does not fluoresce in response to the reading beam being incident thereon, the qubit is in another state (e.g., state 0). For example, the reading beam may be configured to stimulate emission of a particular frequency/wavelength by the qubit (e.g., quantum object) when the qubit is in a particular state and not stimulate emission of the particular frequency/wavelength if the qubit is not in the particular state.

However, in various scenarios, the first species quantum object and/or the second species quantum object may leave or be forced out of the confinement region of the confinement apparatus or switch places (reorder). For example, collisions between background atoms and the first species quantum object or the second species quantum object, may cause the first species quantum object or the second species quantum object to be ejected from the confinement region of the confinement apparatus. Performing a quantum computation with one or more quantum objects missing from the confinement apparatus or in the wrong order leads to computational errors. For example, when an attempt to read and/or determine the quantum state of a quantum object that is actually missing from the confinement apparatus, the reading operation results in determining that the quantum object is in the non-fluorescing state, which may not be an accurate representation of what state the quantum object would be in if the quantum object was present. In various embodiments, the first species quantum object is configured to be a data qubit for the quantum computer and the second species quantum object is configured to be a sympathetic cooling ion. In various embodiments, the first species quantum object may be a single $^{171}Yb^+$ ion used for the qubit and the second species quantum object may be a single $^{138}Ba^+$ ion used for the sympathetic cooling. Various other ion species are used as the first species quantum objects and second species quantum objects in various embodiments.

In various embodiments, a push field and/or an oscillating potential may be generated (e.g., via application of control signals to the at least RF electrode and/or at least one of the plurality of control electrodes) and experienced by the quantum object crystal 110 to cause the quantum object crystal 110 experiencing the push field and/or the oscillating potential to rotate with respect to the RF null axis. For example, the quantum object crystal is caused to rotate such that the crystal axis 190 has a vector component transverse to the RF null axis 105.

When a quantum object is disposed on the RF null axis 105, the quantum object does not experience any radial forces (e.g., forces in a direction substantially perpendicular to the RF null axis 105) as a result of the trapping pseudo-potential generated as a result of the RF voltage being applied to the at least one RF electrode. However, when a quantum object within the confinement region 100 is not disposed on the RF null axis 105, the quantum object will experience an oscillating radial force as a result of the trapping pseudopotential. This oscillating radial force causes the quantum object disposed off of the RF null axis 105 to exhibit oscillations and/or small back and forth motion.

Figure 2:
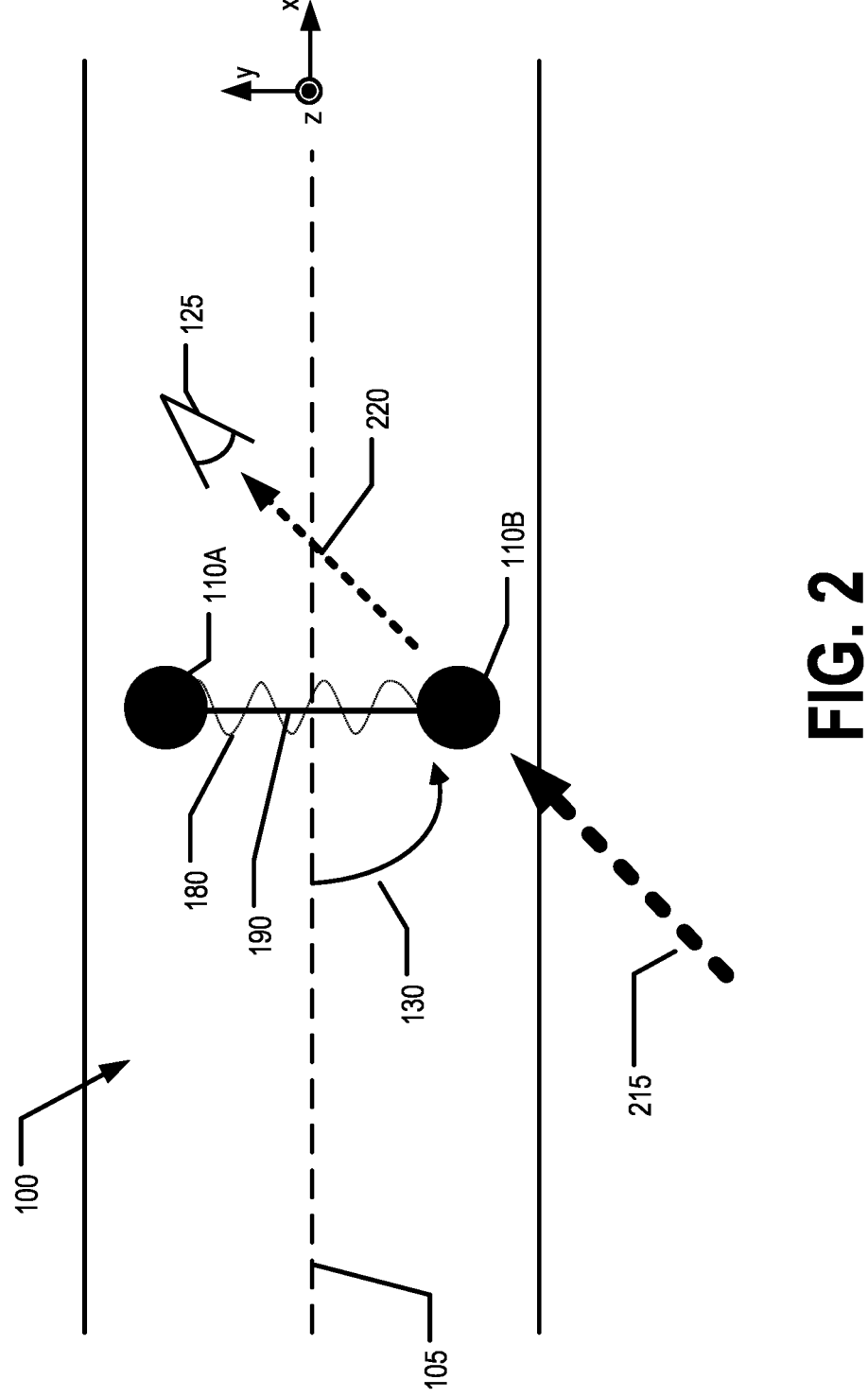
FIG. 2 is a schematic diagram of a quantum object detection function in accordance with an example embodiment.

When the quantum object crystal is rotated such that the crystal axis 190 has a vector component transverse (e.g., substantially perpendicular) to the RF null axis 105, the Coulomb repulsion 180 between the quantum objects of the quantum object crystal 110, the quantum objects push each other away from the RF null axis 105 such that quantum objects of the quantum object crystal exhibit oscillating and/or small back and forth motion in the radial direction (e.g., substantially perpendicular to the RF null axis 105). The phase of the back-and-forth motion may be different for ions on either side of the rf null. FIG. 2 provides a schematic diagram of a rotated quantum object crystal, where a rotated quantum object crystal is a quantum object crystal defining a crystal axis 190 that has a vector component transverse to the RF null axis 105. In various embodiments, a detection beam 215 is provided that is detuned from a particular transition of the second species quantum object 110B. When a detection beam 215, which is either frequency modulated or detuned, is incident on the rotated quantum object crystal, the oscillating motion of the second species quantum object 110B causes the detection beam that is either frequency modulated at the rf drive frequency or detuned from a particular transition by the rf drive frequency of the second species quantum object. Thus, the second species quantum object will fluoresce and/or emit stimulated emission 220 in response to the detection beam 215 being incident thereon. The detection beam 215 is off-resonant (e.g., far off-resonant) from transition out of the qubit space and/or ground state of the first species quantum object. For example, FIG. 2 illustrates a quantum object crystal 110 experiencing a push field 130 and having a detection beam 215 incident thereon, in accordance with various embodiments of the present disclosure. The stimulated emission may be detected (e.g., via detector 125) and it may be determined that both members of the quantum object crystal are present.

Figure 3:
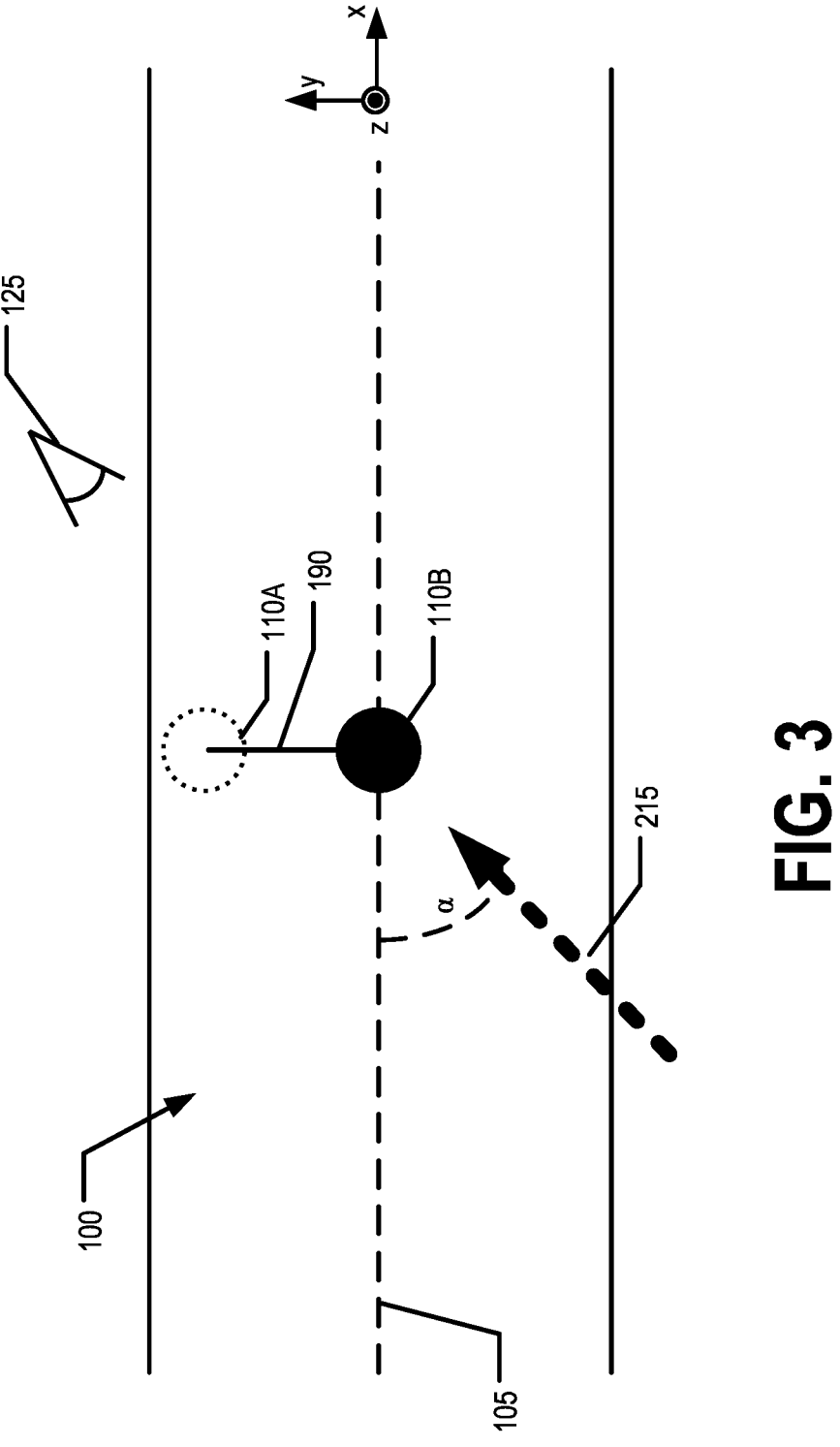
FIG. 3 is a schematic diagram of another quantum object detection function in accordance with an example embodiment.

FIG. 3 provides a schematic diagram of a rotated quantum object crystal 110 with the first species quantum object 110A missing. Due to the first species quantum object 110A not being present, the second species quantum object 110B of the rotated quantum object crystal is disposed on the RF null axis 105 and does not exhibit the oscillating and/or small back and forth motion. Thus, when the detection beam 215 is incident on the second species quantum object 110B, the detection beam 215 is either frequency modulated at the rf drive frequency or detuned from a particular transition by the rf drive frequency of the second species quantum object 110B and the second species quantum object will not fluoresce and/or emit stimulated emission 220 in response to the detection beam 215 being incident thereon. Similarly, if the first species quantum object 110A is present and the second species quantum object 110B is not present, when the detection beam 215 is incident on the quantum object crystal 110, no stimulated emission 220 will be emitted. Thus, when one or both of the members of the quantum object crystal are not present (e.g., are missing) no stimulated emission is detected via detector 125.

Example Quantum Object Confinement Apparatus

FIG. 4 provides a top view of an example confinement apparatus 400 that may be used to confine the quantum object crystal 110. For example, in an example embodiment, the confinement apparatus is an ion trap (e.g., a surface ion trap) and the quantum objects are ions. In an example embodiment, the confinement apparatus 100 (e.g., surface ion trap) is fabricated as part of an ion trap chip and/or part of an ion trap apparatus and/or package. In an example embodiment, the confinement apparatus 400 is at least partially defined by a number of RF electrodes 412 (e.g., 412A, 412B). In various embodiments, the confinement apparatus 400 is at least partially defined by a number of sequences of control electrodes 414 (e.g., 414A, 414B, 414C). Each sequence of control electrodes 414 includes a plurality of control electrodes 416. In an example embodiment, each control electrode 416 and/or at least a non-empty subset of the control electrodes 416 may be operated independently via the application of control signals thereto. In an example embodiment, the confinement apparatus 400 is a surface Paul trap with symmetric RF electrodes 412. In various embodiments, the RF electrodes 412 and the control electrodes 416 generate potentials and/or fields that are experienced by the quantum object crystal 110 within a confinement region 100 of the confinement apparatus 400. In particular, the RF electrodes 412 may be configured to define the confinement region 100 of the confinement apparatus 400 and the control electrodes 416 may be configured to at least partially control movement and/or motion of quantum objects within the confinement region 100.

In various embodiments, the upper surface of the confinement apparatus 400 has a planarized topology. For example, the upper surface of each of the RF electrodes 412 of the number of RF electrodes 412 and the upper surface of each control electrode 416 of the number of sequences of control electrodes 414 may be substantially coplanar.

In various embodiments, the confinement apparatus 400 includes and/or is at least partially defined by a number of RF electrodes 412. The RF electrodes 412 are formed with substantially parallel longitudinal axes 411 (e.g., 411A, 411B) and with substantially coplanar upper surfaces. For example, the RF electrodes 412 are substantially parallel such that a distance between the RF electrodes 412 is approximately constant along the length of the RF electrodes 412 (e.g., the length of an RF electrode being along the longitudinal axes 411 of RF electrodes 412). For example, the upper surfaces of the RF electrodes 412 may be substantially flush with the upper surface of the confinement apparatus 400. In an example embodiment, the number of RF electrodes 412 includes two RF electrodes 412 (e.g., 412A, 412B). In various embodiments, the confinement apparatus 400 may include a plurality of number of RF electrodes 412. For example, the confinement apparatus 400 may be a two-dimensional ion trap that includes multiple numbers (e.g., pairs and/or sets) of RF electrodes 412 with each number (e.g., pair and/or set) of RF electrodes 412 having substantially parallel longitudinal axes 411. In an example embodiment, a first number of RF electrodes 412 have mutually substantially parallel longitudinal axes 411, a second number of RF electrodes 412 have mutually substantially parallel longitudinal axes 411, and the longitudinal axes of the first number of RF electrodes and the longitudinal axes of the second number of RF electrodes are substantially non-parallel (e.g., transverse). FIG. 4 illustrates an example one dimensional confinement apparatus 400 and/or a portion of a two-dimensional confinement apparatus 400 having two RF electrodes 412, though other embodiments may include additional RF electrodes in various configurations.

In various embodiments, two adjacent RF electrodes 412 may be separated (e.g., insulated) from one another by a longitudinal gap. In various embodiments, the confinement region 100 is at least partially over the longitudinal gap. For example, the longitudinal gap may define (in one or two dimensions) the confinement region 100. In various embodiments, the confinement region 100 may extend substantially parallel to the longitudinal axes 411 of the adjacent RF electrodes 412. For example, the longitudinal gap may extend substantially parallel to the x-axis as shown in FIGS. 1-2. In an example embodiment, the longitudinal gap may be at least partially filled with an insulating material (e.g., a dielectric material). In various embodiments, the dielectric material may be silicon dioxide (e.g., formed through thermal oxidation) and/or other dielectric and/or insulating material. In various embodiments, the longitudinal gap has a height (e.g., in the y-direction) of approximately 40 μm to 500 μm. In various embodiments, one or more sequences of control electrodes 414 (e.g., a second sequence of control electrodes 414B) may be disposed and/or formed within the longitudinal gap.

In an example embodiment, a transverse gap may exist between neighboring and/or adjacent control electrodes 416 of the one or more sequences of control electrodes 414. In an example embodiment, the transverse gap may be empty space and/or at least partially filled with a dielectric material to prevent electrical communication between neighboring and/or adjacent electrodes. In an example embodiment, the transverse gap between neighboring and/or adjacent electrodes may be in the range of approximately 1-10 μm.

In an example embodiment, a longitudinal gap exists between a sequence of control electrodes 414 and a neighboring and/or adjacent RF electrode 412. In an example embodiment, the longitudinal gap may be at least partially filled with a dielectric and/or insulating material to prevent electrical communication between control electrodes 416 of the sequence of control electrodes 414 and the RF electrodes 412. In an example embodiment, the longitudinal gap between neighboring and/or adjacent electrodes may be in the range of approximately 1-10 μm.

In various embodiments, the confinement apparatus 400 may be at least partially defined by a number of sequences of control electrodes 414 (e.g., first sequence of control electrodes 414A, second sequence of control electrodes 414B, third sequence of control electrodes 414C). Each sequence of control electrodes 414 is formed to extend substantially parallel to the substantially parallel longitudinal axes 411 of the RF electrodes 412. For example, the number of sequences of control electrodes 414 may extend substantially parallel to the x-axis as shown in FIG. 4. In various embodiments, the number of sequences of control electrodes 414 includes two, three, four, and/or another number of sequences of control electrodes 414. In an example embodiment, the confinement apparatus 400 includes a plurality of number of sequences of control electrodes 414. For example, the illustrated confinement apparatus 400 is a one-dimensional ion trap comprising three sequences of control electrodes 414. For example, the confinement apparatus 400 may be a two-dimensional ion trap that includes multiple numbers of sequences of control electrodes 414 that each extend substantially parallel to a substantially parallel longitudinal axes of a corresponding number of RF electrodes 412. In an example embodiment, a first number of sequences of control electrodes 414 extend substantially parallel to the substantially parallel longitudinal axes 411 of a first number of RF electrodes 412, a second number of sequences of control electrodes 414 extend substantially parallel to the substantially parallel longitudinal axes 411 of a second number of RF electrodes 412, and the longitudinal axes of the first number of RF electrodes and the longitudinal axes of the second number of RF electrodes are substantially non-parallel (e.g., transverse). In some embodiments, each of the control electrodes 416 of the number of sequences of control electrodes 414 can be formed with substantially coplanar upper surfaces that are substantially coplanar with the upper surfaces of the RF electrodes 412.

In an example embodiment (e.g., as illustrated in FIG. 4), a number (e.g., pair) of RF electrodes 412 may be formed between a first sequence of control electrodes 414A and a third sequence of control electrodes 414C with a second sequence of control electrodes 414B extending along the longitudinal gap between the RF electrodes 412. For example, each sequence of control electrodes 414 may extend in a direction substantially parallel to the longitudinal axes 411 of the RF electrodes 412 (e.g., in the x-direction). In various embodiments, the upper surfaces of the sequences of control electrodes 414 are substantially coplanar with the upper surfaces of the RF electrodes 412.

In various embodiments, RF signals may be applied to the RF electrodes 412 to generate an electric and/or magnetic field that acts to maintain a quantum object (e.g., ion) trapped within the confinement apparatus 400 in directions transverse to the longitudinal direction of the confinement apparatus 400 (e.g., the y- and z-directions). In various embodiments, control signals and/or voltages are applied to the control electrodes 416 to generate a desired electric potential field within the confinement region 100. For example, in various embodiments, time-dependent, time-varying, time evolving, and/or non-static direct current (DC) voltages may be applied to the control electrodes 416 to generate a time-dependent, time-varying, time evolving, and/or non-static electric potential field that causes the quantum objects trapped within the confinement apparatus 400 to traverse corresponding trajectories to within the confinement region 100. For example, the quantum objects may be moved between various zones of the confinement apparatus 400 such that various functions may be performed thereon. For example, the quantum objects may be initialized, gated via single qubit gates, gated via double/multiple qubit gates, transported and/or stored, read and/or detected, and/or the like. In an example embodiment, the control electrodes 416 are configured to, responsive to control signals applied thereto, generate push fields and/or oscillating potentials configured to cause a quantum object experiencing the push field and/or oscillating potential to experience oscillations and/or small back and forth movements. In various embodiments, a push field 130 is configured to push a quantum object off of the RF null axis 105 (which is co-located with the longitudinal axis 405 of the confinement region 100 in an example embodiment) of the confinement apparatus 400. A quantum object pushed off of the RF null axis 105 will experience a potential (e.g., at least partially generated by application of the RF signal to the RF electrodes 412) that causes the quantum object to oscillate and/or experience small back and forth motions in a direction transverse (e.g., perpendicular, in an example embodiment) to the RF null axis 105 at the location of the quantum object along the RF null axis 105/longitudinal axis 405 of the confinement apparatus 400. For example, pushing a quantum object radially away from the RF null axis 105 (e.g., in a y-z plane) will experience a potential that causes the quantum object to oscillate and/or experience small back and forth motions in a radial direction of the confinement region (e.g., in the y direction when the quantum object is pushed off the RF null axis 105 in the y direction, as shown in FIG. 2). In various embodiments, an oscillating potential is configured to cause the quantum object experiencing the oscillating potential to oscillate and/or experience small back and forth motions in a direction substantially parallel to RF null axis 105/longitudinal axis 405 of the confinement apparatus 400. For example, experiencing an oscillating potential will cause a quantum object to oscillate and/or experience small back and forth motions in a longitudinal direction of the confinement region 100 (e.g., in the x direction, as shown in FIG. 3).

In various embodiments, the control signals and/or voltages applied to the control electrodes 416 are controlled by one or more connected devices (e.g., a controller 30 as shown in FIG. 6 and/or the like) via leads. For example, depending on the electric monopole and/or dipole (or higher magnitude pole) strength (e.g., electric charge in the case of an electric monopole) of the quantum object, longitudinal voltages may be raised or lowered for control electrodes 416 in the vicinity of a particular quantum object to cause the particular quantum object to traverse a desired trajectory. For example, a controller 30 may control a voltage driver to cause the voltage driver to apply control signals and/or longitudinal voltages to the control electrodes to generate a time-dependent electric potential (e.g., an electric potential that evolves, changes, and/or varies with time) that causes the quantum objects within the confinement apparatus 400 to traverse desired trajectories. In various embodiments, the controller 30 may control a voltage driver (or other signal generator) to cause the voltage driver (or other signal generator) to generate an electric potential that causes the second species quantum object 110B to oscillate or experience small back and forth motions in the direction transverse to the RF null axis 105.

Depending on such factors as the electric monopole and/or dipole (or higher magnitude pole) strength (e.g., electric charge in the case of an electric monopole) of the quantum objects and/or the shape and/or magnitude of the combined electrical and/or magnetic fields, the quantum objects can be stabilized at a particular distance (e.g., approximately 20 μm to approximately 200 μm) above an upper surface of the confinement apparatus 400 (e.g., the coplanar upper surface of the sequences of control electrodes 414 and RF electrodes 412). To further contribute to controlling the transit of quantum objects along desired trajectories, the confinement apparatus 400 may be operated within a cryogenic and/or vacuum chamber capable of cooling the confinement apparatus 400 to a temperature of less than 124 Kelvin (e.g., less than 100 Kelvin, less than 50 Kelvin, less than 10 Kelvin, less than 5 Kelvin, and/or the like), in various embodiments.

In various embodiments, the RF electrodes 412, the sequences of control electrodes 414, and/or the confinement potential generated by the RF electrodes and/or the sequences of control electrodes 414 define a confinement region 100 of the confinement apparatus 400. In an example embodiment, the RF electrodes 412 and/or the confinement potential generated by the RF electrodes define a confinement region 100 of the confinement apparatus 400 and the control electrodes 416 control the movement and/or positioning of the quantum object crystal 110 within the confinement region 100. In various embodiments, the RF electrodes 412, the sequences of control electrodes 414, and/or the confinement potential generated by the RF electrodes and/or the sequences of control electrodes 414 define an axis 405 of the confinement apparatus 400. For example, the RF electrodes 412 and/or the confinement potential generated by the RF electrodes may define an axis 405 of the confinement apparatus 400. In various embodiments, the confinement potential generally acts to align the quantum object crystal 110 within the confinement apparatus 400 along the RF null axis 105 and/or the longitudinal axis 405 of the confinement apparatus 400.

Exemplary quantum object Detection Function

In various embodiments, a controller 30 may control one or more drivers to cause a plurality of potential generating elements (e.g., RF electrodes 412 and control electrodes 416) of a confinement apparatus to generate a time-dependent potential field (e.g., a potential field that evolves with time) that causes the quantum object crystal 110 to be confined within the confinement region 100 of the confinement apparatus 400. An example quantum computer 610 and controller 30 are described in more detail elsewhere herein with respect to FIG. 6 and FIG. 7. The controller 30 may control the one or more drivers (e.g., voltage sources 50), manipulation sources 60 (e.g., lasers), and/or the like to cause a quantum circuit to be performed using the quantum object crystal 110 within the confinement apparatus 400. A quantum circuit is a computational routine comprising coherent quantum operations on quantum data, such as qubits (e.g., the first species quantum object of the quantum object crystal 110). For example, a quantum circuit includes an ordered sequence of quantum gates. Execution and/or performance of a quantum circuit by a quantum computer causes the quantum computer to perform a corresponding algorithm. For example, to perform an algorithm and/or computation, a quantum computer may perform and/or execute a quantum circuit which includes first initializing one or more qubits (e.g., the first species quantum object of the quantum object crystal 110) into an initial quantum state, then performing an ordered series of quantum gates and/or other operations on the one or more qubits, and finally reading and/or detecting the quantum state of at least one of the qubits to determine an outcome and/or result of performing the algorithm and/or computation.

In an example embodiment, a quantum circuit may include reading and/or detecting the quantum state of at least one of the qubits in the middle of the quantum of circuit. For example, after the performance of one or more gates, the quantum state of one or more of the qubits may be read and/or detected, and then one or more further gates may be performed. In an example embodiment, the one or more further gates may be determined, modified, adjusted, selected, ordered, and/or the like based at least in part on the result of reading and/or detecting the quantum state of the at least one qubit in the middle of the quantum circuit. To enable reading and/or detecting the quantum state of at least one qubit during the performance of the quantum circuit (e.g., in the middle of the quantum circuit), a quantum object detection function is configured to be performed before any reading and/or detecting the quantum state of at least one qubit so as to accurately detect quantum objects in the ion trap without introducing qubit errors or otherwise negatively affecting the quantum state of at least one qubit if no loss has occurred. In various embodiments, quantum object detection functions are performed periodically during the performance of a quantum circuit to determine whether to continue with the performance of the quantum circuit (e.g., if one or more quantum objects have been lost, it may be desirable to stop performance of the quantum circuit, reload quantum objects, and start the quantum circuit over), to reload one or more quantum objects into the confinement apparatus, and/or the like. In this way, the probability of quantum information/data stored by a qubit of the quantum object crystal being lost, disturbed, disrupted, destroyed, and/or the like during the detecting process will be reduced. FIG. 5 provides a flowchart illustrating processes, procedures, operations, and/or the like performed by a controller 30, for example, to control a quantum computer and/or cause a quantum circuit to be executed and/or performed that includes an example embodiment of the quantum object detecting function.

Starting at step/operation 502, the controller 30 may control one or more voltage sources 50 to cause a quantum object confinement apparatus 400 to confine a quantum object crystal 110. The quantum object confinement apparatus 400 includes (a) one or more radio frequency (RF) electrodes 412 defining an RF null axis 105 of the quantum object confinement apparatus 400 and (b) a plurality of control electrodes 416. The quantum object crystal 110 (i) includes at least one of (a) a first species quantum object 110A or (b) a second species quantum object 110B and (ii) defines a crystal axis 190 that is aligned along the RF null axis 105 of the quantum object confinement apparatus 400. For example, when the quantum object is disposed on the RF null axis 105, the quantum object does not experience any radial forces (e.g., forces in a direction substantially perpendicular to the RF null axis 105) as a result of the trapping pseudopotential generated as a result of the RF voltage being applied to the at least one RF electrode.

As the controller 30 may execute executable instructions for performing a quantum object loss detecting of the quantum object crystal 110 via the processing device 1005 of the controller 30. For example, at step/operation 504, the controller 30 may cause the voltage sources 50 to provide first control signals to one or more control electrodes 416 that causes the quantum object crystal 110 to experience a push field 130, as illustrated in FIG. 2. In various embodiments, the push field 130 causes the quantum object crystal 110 to experience the push field and/or the oscillating potential to rotate with respect to the RF null axis such that the crystal axis 190 has a vector component transverse to the RF null axis 105. When the quantum object within the confinement region 100 is not disposed on the RF null axis 105, the quantum object will experience an oscillating radial force as a result of the trapping pseudopotential. This oscillating radial force causes the quantum object disposed off the RF null axis 105 to exhibit oscillations and/or small back and forth motion. The oscillations within the confinement potential causes both the first species quantum object 110A and the second species quantum object 110B to oscillate and/or experience a small back and forth motion at the RF drive frequency.

When a quantum object crystal 110 including a first species quantum object 110A and a second species quantum object 110B is placed in a trap within a quantum object confinement apparatus 400, the mutual coulomb repulsion between the first species quantum object 110A and the second species quantum object 110B will cause both of them to relocate from the original trapping location along the RF null axis 105 as shown in FIG. 1. The first species quantum object 110A and the second species quantum object 110B will not experience any additional micromotion and will stay at the weakest potential confined within the quantum object confinement apparatus. However, when the quantum object crystal is rotated such that the crystal axis 190 has a vector component transverse (e.g., substantially perpendicular) to the RF null axis 105, the Coulomb repulsion 180 between the quantum objects of the quantum object crystal 110, the quantum objects push each other away from the RF null axis 105 such that quantum objects of the quantum object crystal exhibit oscillating and/or small back and forth motion in the radial direction (e.g., substantially perpendicular to the RF null axis 105).

At step/operation 506, the controller 30 causes at least one manipulation source 60 to generate and provide a detection beam 215. In various embodiments, the detection beam 215 is provided that is either frequency modulated at the rf drive frequency or detuned from a particular transition by the rf drive frequency of the second species quantum object. When a detection beam 215 is incident on the rotated quantum object crystal, the oscillating motion of the second species quantum object 110B causes the detection beam to be either frequency modulated at the rf drive frequency or detuned from a particular transition by the rf drive frequency of the second species quantum object. Thus, the second species quantum object will fluoresce and/or emit stimulated emission 220 in response to the detection beam 215 being incident thereon. The detection beam 215 is off-resonant (e.g., far off-resonant) from transition out of the qubit space and/or ground state of the first species quantum object. For example, FIG. 2 illustrates a quantum object crystal 110 experiencing a push field 130 and having a detection beam 215 incident thereon, in accordance with various embodiments of the present disclosure. The stimulated emission may be detected (e.g., via detector 125) and it may be determined that both members of the quantum object crystal are present.

At step/operation 508, the controller 30 may receive a signal indicative of the quantum object crystal response to the modulated detection beam being incident on the at least the portion of the quantum object crystal. For example, the signal from the detector 125 may indicate the quantum object crystal response to the detection beam 215 being incident on the at least the portion of the quantum object crystal 110. The controller 30 may then adjust, modify, update, and/or the like the remaining portion of the quantum circuit based on whether the second species quantum object is being detected by the detection beam 215. For example, the controller 30 may make changes to the remaining portion of the quantum circuit based on and/or responsive to signal indicative of the quantum object crystal response to the detection beam 215 being incident on the at least the portion of the quantum object crystal during the course of performing and/or executing the quantum circuit.

At step/operation 510, the controller 30 may determine whether both (a) the first species quantum object 110A and (b) the second species quantum object 110B are present in the quantum object crystal and (c) that the two species are in the expected ordering. In an example embodiment, both the first species quantum object 110A and the second species quantum object 110B are present, the fluorescence may be detected by the detector 125. When the stimulated emission 220 in response to the detection beam 215 being incident thereon is detected by the detector 125, the signal from the detector 125 may indicate the quantum object crystal is responsive to the detection beam 215 being incident on the at least the portion of the quantum object crystal 110 and the quantum object loss does not occur to the quantum object crystal 110. If it is determined that the quantum object loss does not occur to the quantum object crystal, the quantum circuit using the first species quantum object may be executed.

In an example embodiment, the first species quantum object 110A is present and the second species quantum object 110B is missing, no fluorescence may be detected by the detector 125. In an example embodiment, both the first species quantum object 110A and the second species quantum object 110B are missing, no fluorescence may be detected by the detector 125. In an example embodiment, the first species quantum object 110A is missing and the second species quantum object 110B is present, no fluorescence may be detected by the detector 125. For example, as shown in FIG. 3, the second species quantum object 110B is present, the second species quantum object 110B will not be pushed out the RF null axis 105 due to the lack of coulomb repulsion from the first species quantum object 110A. That is, the second species quantum object 110B will remain on the RF null axis even when the push field and/or an oscillating potential 130 is generated and experience by the second species quantum object 110B. Since the detection beam 215 is modulated with the wavelength that is tuned to the micromotion sideband of the second species quantum object 110B, the fluorescence will be suppressed by the detuning of the micromotion sideband from the carrier transition of the second species quantum object 110B.

When no fluorescence is detected by the detector 125, the signal from the detector 125 indicates the quantum object crystal 110 is not responsive to the modulated detection beam 225 being incident on the at least the portion of the quantum object crystal 110. In other words, the quantum object loss or the unexpected reordering has occurred to the quantum object crystal 110. If it is determined that the quantum object loss or the unexpected reordering has occurred to the quantum object crystal, the method may proceed to step 512, where the controller 30 causes at least one manipulation source 60 to cause the detection beam 215 that is incident on at least a portion of the quantum object crystal to flip a modulation phase by π.

At step/operation 514, the controller 30 may receive a signal indicative of the quantum object crystal response to the modulated detection beam being incident on the at least the portion of the quantum object crystal. Similar to step 508, the signal from the detector 125 may indicate the quantum object crystal response to the modulated detection beam 215 with a flipped modulation phase by π being incident on the at least the portion of the quantum object crystal 110.

At step/operation 516, the controller 30 may determine whether the first species quantum object 110A and the second species quantum object 110B are present in the quantum object crystal, but the two species are in the unexpected ordering.

At step/operation 518, when the first species quantum object 110A and the second species quantum object 110B are in an unexpected ordering, the controller 30 may cause the voltage sources 50 to provide first control signals to one or more control electrodes 416 that causes the quantum object crystal 110 to further rotate 180°. For example, when the first species quantum object 110A and the second species quantum object 110B are in an unexpected ordering, the step/operation 518 may correct the order of the first species quantum object 110A and the second species quantum object 110B.

At step/operation 522, when the unexpected ordering does not occur, the controller 30 may adjust the push field and/or the oscillating potential to cause any quantum objects of the quantum object crystal 110 present at that location to be ejected from the confinement region 110. Then the controller 30 may restart the process at step/operation 502 to control one or more voltage sources 50 to cause a quantum object confinement apparatus 400 to confine a new quantum object crystal. For example, new ions that are already loaded may be moved into the empty position or new ions can be loaded into the empty position and used to continue the circuit.

At step/operation 520, when the controller 30 determines that the quantum object loss does not occur to the quantum object crystal 110, the controller 30 may cause the quantum computer 610 to begin performance of the quantum circuit. For example, the controller 30 may receive a quantum circuit and/or other executable instructions (e.g., from computing entity 10 via one or more wired and/or wireless networks) that causes the controller 30 to control one or more drivers such that voltage sources 50, manipulation sources 60, and/or other components of the quantum computer 910 start to perform a quantum circuit. The controller 30 may then cause one or more gates (e.g., using the one or more manipulation sources 60) to be performed on the first species quantum object 110A such that the quantum state of the first species quantum object 110A is evolved in a particular manner within the defined qubit space of the quantum object crystal 110.

In an example embodiment, the quantum circuit using the first species quantum object may be executed. In an example embodiment, during the performance of the quantum circuit, a read function to be performed on the first species quantum object may be identified, where the causing of the at least one first control signal to be provided to the at least one control electrode and the causing of the manipulation source to generate and provide a reading beam are performed responsive to identifying the read function to be performed. In an example embodiment, the performance of the quantum circuit further includes receiving a read result responsive to the reading beam being incident at least in part on the first species quantum object; and adjusting the quantum circuit based at least in part on the read result such that the adjusted quantum circuit is executed.

At step/operation 520, the controller 30 may further control various components of the quantum computer 610 to continue performing and/or executing the quantum circuit. For example, the quantum computer 610 may continue performing and/or executing the quantum circuit, including performing one or more gates, moving quantum objects within the confinement apparatus 400, performing additional reading and/or detecting functions (such as quantum object loss detecting functions), and/or the like. The controller 30 may then communicate one or more results of performing and/or executing the quantum circuit to a computing entity 10 via one or more wired and/or wireless networks 20.

Technical Advantages

Various embodiments provide technical solutions to the technical problem of detecting quantum objects within a confinement apparatus without disturbing quantum information/data stored and/or encoded by the quantum state of the quantum objects within the confinement apparatus if no quantum object loss has occurred. For example, trapped ion quantum computer makes use of multi-species quantum object crystals, where one species is the data qubit used for computation and the other is used for sympathetic cooling. The qubit errors may be introduced, and the quantum information encoded by the quantum state of the quantum objects may be negatively affected if detection is performed directly on the quantum objects. Various embodiments enable detecting the quantum objects by detecting the quantum objects used for sympathetic cooling may preserve the quantum information/data stored by the quantum objects during detecting process. Various embodiments enable detecting quantum objects to be performed during the middle of the performance and/or execution of a quantum circuit (e.g., by a quantum computer) without disrupting the quantum information/data stored by the species quantum objects during the performance of the detection function.

Thus, various embodiments provide technical improvements to the fields of quantum computer operation (e.g., for a QCCD-based quantum computer and/or the like) and to the field of detecting the presence of quantum objects within a quantum object confinement apparatus in applications that allow for the maintenance of quantum information/data stored by quantum objects.

Exemplary Quantum Computer Comprising an Ion Trap Apparatus

As described above, a quantum object loss detection function is performed by a controller 30 of a quantum computer 610, in various embodiments. FIG. 6 provides a schematic diagram of an example quantum computer system 600 comprising a confinement apparatus 400 (e.g., an ion trap), in accordance with an example embodiment.

In various embodiments, the quantum computer system 600 includes a computing entity 10 and a quantum computer 610. In various embodiments, the quantum computer 610 includes a controller 30, a cryostat and/or vacuum chamber 40 enclosing a confinement apparatus 400, one or more manipulation sources 60, one or more voltage sources 50, one or more magnetic field generators 70 (e.g., 70A, 70B), an optics collection system 80, and/or the like. In various embodiments, the controller 30 is configured to control the operation of (e.g., control one or more drivers configured to cause operation of) the manipulation sources 60, voltage sources 50, magnetic field generators 70, a vacuum system and/or cryogenic cooling system (not shown), and/or the like. In various embodiments, the controller 30 is configured to receive signals (e.g., electrical signals) generated and provided by the optics collection system 80.

In an example embodiment, the one or more manipulation sources 60 may include one or more sources (e.g., optical lasers, microwave sources, and/or the like). In various embodiments, the one or more manipulation sources 60 are configured to manipulate and/or cause a controlled quantum state evolution of one or more quantum objects 110A/110B within the confinement apparatus 400. In an example embodiment, at least one of the one or more manipulation sources 60 is configured to generate and provide a reading beam 115. For example, in an example embodiment, where the one or more manipulation sources 60 include one or more lasers, the lasers may provide one or more laser beams to the confinement apparatus within the cryogenic and/or vacuum chamber 40 via beam paths 66 (e.g., 66A, 66B, 66C).

In various embodiments, the quantum computer 610 includes one or more voltage sources 50. For example, the voltage sources may be arbitrary wave generators (AWG), and/or other voltage signal generators. For example, the voltage sources 50 may include a plurality of longitudinal voltage drivers and/or voltage sources and/or at least one RF driver and/or voltage source. The voltage sources 50 may be electrically coupled to the corresponding potential generating elements (e.g., control electrodes 416 and/or RF electrodes 412) of the confinement apparatus 400, in an example embodiment.

In various embodiments, the quantum computer 610 includes one or more magnetic field generators 70 (e.g., 70A, 70B). For example, the magnetic field generator may be an internal magnetic field generator 70A disposed within the cryogenic and/or vacuum chamber 40 and/or an external magnetic field generator 70B disposed outside of the cryogenic and/or vacuum chamber 40. In various embodiments, the magnetic field generators 70 include permanent magnets, Helmholtz coils, electrical magnets, and/or the like. In various embodiments, the magnetic field generators 70 are configured to generate a magnetic field at one or more regions of the quantum object confinement apparatus 400 that has a particular magnitude and a particular magnetic field direction in the one or more regions of the quantum object confinement apparatus 400.

In various embodiments, the quantum computer 610 includes an optics collection system 80 configured to collect and/or detect photons (e.g., stimulated emission 120) generated by qubits (e.g., during reading procedures). The optics collection system 80 may include one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits (e.g., quantum objects) of the quantum computer 610. In various embodiments, the detectors may be in electronic communication with the quantum system controller 30 via one or more A/D converters 1025 (see FIG. 7) and/or the like.

In various embodiments, a computing entity 10 is configured to allow a user to provide input to the quantum computer 610 (e.g., via a user interface of the computing entity 10) and receive, view, and/or the like output from the quantum computer 610. The computing entity 10 may be in communication with the controller 30 of the quantum computer 610 via one or more wired or wireless networks 20 and/or via direct wired and/or wireless communications. In an example embodiment, the computing entity 10 may translate, configure, format, and/or the like information/data, quantum computing algorithms (e.g., quantum circuits), and/or the like into a computing language, executable instructions, command sets, and/or the like that the controller 30 can understand, execute, and/or implement.

In various embodiments, the controller 30 is configured to control the voltage sources 50, magnetic field generators 70, cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40, configured to manipulate and/or cause a controlled evolution of quantum states of one or more quantum objects within the confinement apparatus, and/or read and/or detect a quantum (e.g., qubit) state of one or more quantum objects within the confinement apparatus. For example, the controller 30 may cause a controlled evolution of quantum states of one or more quantum objects within the confinement apparatus to execute a quantum circuit and/or algorithm. For example, the controller 30 may read and/or detect quantum states of one or more quantum objects within the confinement apparatus at one or more points during the execution of a quantum circuit. In various embodiments, the quantum objects confined within the confinement apparatus are used as qubits of the quantum computer 610.

Exemplary Controller

In various embodiments, a confinement apparatus 400 is incorporated into a quantum computer 610. In various embodiments, a quantum computer 610 further includes a controller 30 configured to control various elements of the quantum computer 610. For example, the controller 30 may be configured to control the voltage sources 50, a cryogenic system and/or vacuum system controlling the temperature and pressure within the cryogenic and/or vacuum chamber 40, manipulation sources 60, magnetic field generators 70, and/or other systems controlling the environmental conditions (e.g., temperature, humidity, pressure, and/or the like) within the cryogenic and/or vacuum chamber 40, configured to manipulate and/or cause a controlled evolution of quantum states of one or more quantum objects within the confinement apparatus, and/or read and/or detect a quantum state of one or more quantum objects within the confinement apparatus.

As shown in FIG. 7, in various embodiments, the controller 30 may include various controller elements including processing device 1005, memory 1010, driver controller elements 1015, a communication interface 1020, analog-digital converter elements 1025, and/or the like. For example, the processing device 1005 may include programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing device 1005 of the controller 30 includes a clock and/or is in communication with a clock.

For example, the memory 1010 may include non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 1010 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language (s), and/or the like), and/or the like. In an example embodiment, execution of at least a portion of the computer program code stored in the memory 1010 (e.g., by a processing device 1005) causes the controller 30 to perform one or more steps, operations, processes, procedures and/or the like described herein for controlling one or more components of the quantum computer 610 (e.g., voltages sources 50, manipulation sources 60, magnetic field generators 70, and/or the like) to cause a controlled evolution of quantum states of one or more quantum objects, detect and/or read the quantum state of one or more quantum objects, and/or the like.

In various embodiments, the driver controller elements 1015 may include one or more drivers and/or controller elements each configured to control one or more drivers. In various embodiments, the driver controller elements 1015 may include drivers and/or driver controllers. For example, the driver controllers may be configured to cause one or more corresponding drivers to be operated in accordance with executable instructions, commands, and/or the like scheduled and executed by the controller 30 (e.g., by the processing device 1005). In various embodiments, the driver controller elements 1015 may enable the controller 30 to operate a manipulation source 60. In various embodiments, the drivers may be laser drivers; vacuum component drivers; drivers for controlling the flow of current and/or voltage applied to longitudinal, RF, and/or other electrodes used for maintaining and/or controlling the confinement potential of the confinement apparatus (and/or other driver for providing driver action sequences and/or control signals to potential generating elements of the confinement apparatus); cryogenic and/or vacuum system component drivers; and/or the like. For example, the drivers may control and/or include longitudinal and/or RF voltage drivers and/or voltage sources that provide voltages and/or electrical signals to the control electrodes 416 and/or RF electrodes 412. In various embodiments, the controller 30 includes means for communicating and/or receiving signals from one or more detectors 125 such as optical receiver components (e.g., cameras, MEMs cameras, CCD cameras, photodiodes, photomultiplier tubes, and/or the like). For example, the controller 30 may include one or more analog-digital converter elements 1025 configured to receive signals from one or more detectors 125, optical receiver components, calibration sensors, and/or the like.

In various embodiments, the controller 30 may include a communication interface 1020 for interfacing and/or communicating with a computing entity 10. For example, the controller 30 may include a communication interface 1020 for receiving executable instructions, command sets, and/or the like from the computing entity 10 and providing output received from the quantum computer 610 (e.g., from an optical collection system comprising one or more detectors 125) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 8 provides an illustrative schematic representative of an example computing entity 10 that can be used in conjunction with embodiments of the present invention. In various embodiments, a computing entity 10 is configured to allow a user to provide input to the quantum computer 610 (e.g., via a user interface of the computing entity 10) and receive, display, analyze, and/or the like output from the quantum computer 610.

As shown in FIG. 8, a computing entity 10 can include an antenna 1112, a transmitter 1104 (e.g., radio), a receiver 1106 (e.g., radio), and a processing element 1108 that provides signals to and receives signals from the transmitter 1104 and receiver 1106, respectively. The signals provided to and received from the transmitter 1104 and the receiver 1106, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity

10 can also download changes, add-ons, and updates, for instance, to its firmware, software (e.g., including executable instructions, applications, program modules), and operating system.

The computing entity 10 may also include a user interface device comprising one or more user input/output interfaces (e.g., a display 1116 and/or speaker/speaker driver coupled to a processing element 1108 and a touch screen, keyboard, mouse, and/or microphone coupled to a processing element 1108). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can include any of a number of devices allowing the computing entity 10 to receive data, such as a keypad 1118 (hard or soft), a touch display, voice/speech or motion interfaces, scanners, readers, or other input device. In embodiments including a keypad 1118, the keypad 1118 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 1122 and/or non-volatile storage or memory 1124, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method performed by a controller of a quantum computer, the method comprising:

controlling one or more voltage sources to cause a quantum object confinement apparatus to confine a quantum object crystal, the quantum object confinement apparatus comprises (a) one or more radio frequency (RF) electrodes defining an RF null axis of the quantum object confinement apparatus and (b) a plurality of control electrodes, wherein the quantum object crystal (i) is intended to comprise (a) a first species quantum object and (b) a second species quantum object and (ii) defines a crystal axis that is aligned along the RF null axis of the quantum object confinement apparatus, wherein the first species quantum object is an atom or ion of a first atomic species and the second species quantum object is an atom or ion of a second atomic species;

causing at least one first control signal to be provided to at least one control electrode of the plurality of control electrodes, wherein the at least one first control signal causes the at least one control electrode to generate a push field configured to cause the crystal axis to rotate with respect to the RF null axis such that the crystal axis has a vector component transverse to the RF null axis;

causing a manipulation source to generate and provide a modulated detection beam that is incident on at least a portion of the quantum object crystal;

receiving a first signal indicative of a quantum object crystal response to the modulated detection beam being incident on the at least the portion of the quantum object crystal;

determining, based on the first signal, whether (a) both the first species quantum object and the second species quantum object are present in the quantum object crystal, and (b) the first species quantum object and the second species quantum object are in an expected ordering;

responsive to determining that (a) the first species quantum object and the second species quantum object are not both present in the quantum object crystal or (b) the first species quantum object and the second species quantum object are not in an expected ordering:

causing the detection beam that is incident on at least a portion of the quantum object crystal to flip a modulation phase by $\pi$;

receiving a second signal indicative of the quantum object crystal response to the detection beam with a flipped modulation phase being incident on the at least the portion of the quantum object crystal; and determining, based on the second signal, whether the first species quantum object and the second species quantum object are in an unexpected ordering.

2. The method of claim 1, further comprising:

responsive to determining, based on the second signal, that the unexpected ordering is not detected by the modulated detection beam, determining that the first species quantum object or the second species quantum object is missing from the quantum object confinement apparatus, and responsive to determining, based on the second signal, that the unexpected ordering is detected by the modulated detection beam, causing the at least one control electrode to generate a push field configured to cause the crystal axis to rotate 180°.

3. The method of claim 1, further comprising:

responsive to determining that (a) both the first species quantum object and the second species quantum object are present, and (b) that the first species quantum object and the second species quantum object are in an expected ordering:

beginning to execute a quantum circuit using the first species quantum object within the quantum object confinement apparatus;

during the performance of the quantum circuit, identifying a read function to be performed on the first species quantum object, wherein the causing of the at least one first control signal to be provided to the at least one control electrode and the causing of the manipulation source to generate and provide a reading beam are performed responsive to identifying the read function to be performed; and continuing to execute the quantum circuit.

4. The method of claim 3, further comprising:

receiving a read result responsive to the reading beam being incident at least in part on the first species quantum object; and adjusting the quantum circuit based at least in part on the read result such that the adjusted quantum circuit is executed.

5. The method of claim 1, wherein the first species quantum object is a data qubit for the quantum computer and the second species quantum object is a sympathetic cooling ion.

6. The method of claim 5, wherein the first species quantum object is a Ba ion, and the second species quantum object is an Yb ion.

7. The method of claim 1, wherein the modulated detection beam that is incident on at least the portion of the quantum object crystal has a wavelength tuned to a micromotion sideband of the second species quantum object.

8. The method of claim 2, further comprising, after causing the crystal axis to rotate 180°, executing at least a portion of a quantum circuit using the first species quantum object within the quantum object confinement apparatus.

9. The method of claim 2, further comprising, responsive to determining that the first species quantum object or the second species quantum object is missing from the quantum object confinement apparatus, replacing the quantum object crystal with a new quantum object crystal.

10. A controller operatively connected to one or more components of a system comprising a quantum object confinement apparatus, the quantum object confinement apparatus comprising (a) one or more radio frequency (RF) electrodes defining an RF null axis of the quantum object confinement apparatus and (b) a plurality of control electrodes and the one or more components comprising (a) voltage sources and (b) manipulation sources, the controller configured to:

control one or more voltage sources to cause the quantum object confinement apparatus to confine a quantum object crystal, wherein the quantum object crystal (i) is intended to comprise (a) a first species quantum object and (b) a second species quantum object and (ii) defines a crystal axis that is aligned along the RF null axis of the quantum object confinement apparatus, wherein the first species quantum object is an atom or ion of a first atomic species and the second species quantum object is an atom or ion of a second atomic species;

cause at least one first control signal to be provided to at least one control electrode of the plurality of control electrodes, wherein the at least one first control signal causes the at least one control electrode to generate a push field configured to cause the crystal axis to rotate with respect to the RF null axis such that the crystal axis has a vector component transverse to the RF null axis;

cause a manipulation source to generate and provide a modulated detection beam that is incident on at least a portion of the quantum object crystal;

receive a first signal indicative of a quantum object crystal response to the modulated detection beam being incident on the at least the portion of the quantum object crystal;

determine, based on the first signal, whether (a) both the first species quantum object and the second species quantum object are present in the quantum object crystal, and (b) that the first species quantum object and the second species quantum object are in an expected ordering;

responsive to determining that (a) the first species quantum object and the second species quantum object are not both present in the quantum object crystal or (b) the first species quantum object and the second species quantum object are not in an expected ordering:

cause the detection beam that is incident on at least a portion of the quantum object crystal to flip a modulation phase by $\pi$;

receive a second signal indicative of the quantum object crystal response to the detection beam with a flipped modulation phase being incident on the at least the portion of the quantum object crystal; and determine, based on the second signal, whether the first species quantum object and the second species quantum object are in an unexpected ordering.

11. The controller of claim 10, wherein the controller is further configured to:

responsive to determining, based on the second signal, that the unexpected ordering is not detected by the modulated detection beam, determine that the first species quantum object or the second species quantum object is missing from the quantum object confinement apparatus, and responsive to determining, based on the second signal, that the unexpected ordering is detected by the modulated detection beam, cause the at least one control electrode to generate a push field configured to cause the crystal axis to rotate 180°.

12. The controller of claim 10, wherein the controller is further configured to:

responsive to determining that (a) both the first species quantum object and the second species quantum object are present, and (b) that the first species quantum object and the second species quantum object are in an expected ordering:

begin to execute a quantum circuit using the first species quantum object within the quantum object confinement apparatus;

during the performance of the quantum circuit, identify a read function to be performed on the first species quantum object, wherein the causing of the at least one first control signal to be provided to the at least one control electrode and the causing of the manipulation source to generate and provide a reading beam are performed responsive to identifying the read function to be performed; and continue to execute the quantum circuit.

13. The controller of claim 12, further configured to:

receive a read result responsive to the reading beam being incident at least in part on the first species quantum object; and adjust the quantum circuit based at least in part on the read result such that the adjusted quantum circuit is executed.

14. The controller of claim 10, wherein the the system comprises a quantum computer and first species quantum object is a data qubit for the quantum computer and the second species quantum object is a sympathetic cooling ion.

15. The controller of claim 14, wherein the first species quantum object is a Ba ion, and the second species quantum object is an Yb ion.

16. The controller of claim 10, wherein the modulated detection beam that is incident on at least the portion of the quantum object crystal has a wavelength tuned to a micro-motion sideband of the second species quantum object.

17. The controller of claim 11, wherein the controller is further configured to, after causing the crystal axis to rotate 180°, execute at least a portion of a quantum circuit using the first species quantum object within the quantum object confinement apparatus.

18. A computer program product comprising a non-transitory computer-readable medium storing executable instructions, the executable instructions configured to, when executed by a processing device of a controller configured to control operation of one or more components of a quantum computer, cause the controller to:

control one or more voltage sources to cause a quantum object confinement apparatus to confine a quantum object crystal, the quantum object confinement apparatus comprises (a) one or more radio frequency (RF) electrodes defining an RF null axis of the quantum object confinement apparatus and (b) a plurality of control electrodes, wherein the quantum object crystal (i) is intended to comprise (a) a first species quantum object and (b) a second species quantum object and (ii) defines a crystal axis that is aligned along the RF null axis of the quantum object confinement apparatus, wherein the first species quantum object is an atom or ion of a first atomic species and the second species quantum object is an atom or ion of a second atomic species;

cause at least one first control signal to be provided to at least one control electrode of the plurality of control electrodes, wherein the at least one first control signal causes the at least one control electrode to generate a push field configured to cause the crystal axis to rotate with respect to the RF null axis such that the crystal axis has a vector component transverse to the RF null axis;

cause a manipulation source to generate and provide a modulated detection beam that is incident on at least a portion of the quantum object crystal;

receive a first signal indicative of a quantum object crystal response to the modulated detection beam being incident on the at least the portion of the quantum object crystal;

determine, based on the first signal, whether (a) both the first species quantum object and the second species quantum object are present in the quantum object crystal, and (b) the first species quantum object and the second species quantum object are in an expected ordering;

responsive to determining that (a) the first species quantum object and the second species quantum object are not both present in the quantum object crystal or (b) the first species quantum object and the second species quantum object are not in an expected ordering:

cause the detection beam that is incident on at least a portion of the quantum object crystal to flip a modulation phase by $\pi$;

receive a second signal indicative of the quantum object crystal response to the detection beam with a flipped modulation phase being incident on the at least the portion of the quantum object crystal; and determine, based on the second signal, whether the first species quantum object and the second species quantum object are in an unexpected ordering.

19. The computer program product of claim 18, wherein the executable instructions are further configured to, when executed by the processing device of the controller, cause the controller to:

responsive to determining, based on the second signal, that the unexpected ordering is not detected by the modulated detection beam, determine that the first species quantum object or the second species quantum object is missing from the quantum object confinement apparatus, and responsive to determining, based on the second signal, that the unexpected ordering is detected by the modulated detection beam, cause the at least one control electrode to generate a push field configured to cause the crystal axis to rotate 180°.

20. The computer program product of claim 18, wherein the executable instructions are further configured to, when executed by the processing device of the controller, cause the controller to:

responsive to determining that (a) both the first species quantum object and the second species quantum object being present, and (b) that the first species quantum object and the second species quantum object are in an expected ordering:

begin to execute a quantum circuit using the first species quantum object within the quantum object confinement apparatus;

during the performance of the quantum circuit, identify a read function to be performed on the first species quantum object, wherein the causing of the at least one first control signal to be provided to the at least one control electrode and the causing of the manipulation source to generate and provide a reading beam are performed responsive to identifying the read function to be performed; and continue to execute the quantum circuit.

* * * * *